(12) United States Patent
Newcomb

(10) Patent No.: US 6,741,000 B2
(45) Date of Patent: May 25, 2004

(54) ELECTRO-MAGNETIC ARCHIMEDEAN SCREW MOTOR-GENERATOR

(76) Inventor: Ronald A. Newcomb, 5514 Waring Rd., San Diego, CA (US) 92120

( * ) Notice: Subject to any disclaimer, the term of this patent is extended or adjusted under 35 U.S.C. 154(b) by 0 days.

(21) Appl. No.: 10/216,013

(22) Filed: Aug. 8, 2002

(65) Prior Publication Data

US 2004/0027020 A1 Feb. 12, 2004

(51) Int. Cl.[7] .............................. F03B 13/10; H02K 7/18
(52) U.S. Cl. ...................... 310/87; 310/156.01; 290/54; 416/DIG. 4
(58) Field of Search ................ 310/156, 87; 290/43–44, 290/53–55; 416/DIG. 4; 405/75–76, 78; 114/57; 440/49

(56) References Cited

U.S. PATENT DOCUMENTS

| | | | | |
|---|---|---|---|---|
| 4,224,527 A | * | 9/1980 | Thompson | 290/54 |
| 4,317,330 A | * | 3/1982 | Brankovics | 60/398 |
| 4,403,177 A | | 9/1983 | Weber et al. | 318/254 |
| 4,500,259 A | * | 2/1985 | Schumacher | 416/122 |
| 4,546,293 A | | 10/1985 | Peterson et al. | 318/254 |
| 4,688,998 A | | 8/1987 | Olsen et al. | 417/356 |
| 4,846,152 A | | 7/1989 | Wampler et al. | 600/16 |
| 4,959,183 A | | 9/1990 | Jameson | 261/87 |
| 5,139,391 A | * | 8/1992 | Carrouset | 415/74 |
| 5,209,650 A | * | 5/1993 | Lemieux | 417/356 |
| 5,288,215 A | | 2/1994 | Chancellor et al. | 417/423.7 |
| 5,527,159 A | * | 6/1996 | Bozeman et al. | 417/45 |
| 5,722,864 A | * | 3/1998 | Andiarena | 440/5 |
| 6,068,454 A | * | 5/2000 | Gaston et al. | 417/356 |
| 6,087,750 A | * | 7/2000 | Raad | 310/152 |
| 6,210,105 B1 | | 4/2001 | Irish | 415/143 |
| RE37,233 E | | 6/2001 | Chancellor et al. | 417/423.7 |
| 6,357,997 B1 | * | 3/2002 | Rosefsky | 415/60 |

FOREIGN PATENT DOCUMENTS

JP 2001-298902 * 10/2001 .......... F03B/13/10

OTHER PUBLICATIONS

Frizell et al. "*Engineering Evaluation opf the Red Bluff Research Pumping Plant on the Sacramento River in Northern California: 1995–1998*," Sep. 1999, Red Bluff, CA.

Borthwick et al. "*Investigations of Fish Entrainment by Archimedes and Internal Helical Pumps at the Red Bluff Research Pumping Plant, Sacramento River, California: Feb. 1997–Jun. 1998*," Oct. 1999, Red Bluff, CA.

Weber et al. "*Plasma Cortisol Levels and Behavioral Stress Responses of Juvenile Chinook Salmon Passed Through Archimedes Lifts and an Internal Helical Pump at Red Bluff Research Pumping Plant, Sacramento River, California*," Jul. 2000, Red Bluff, CA.

McNabb et al. "*Experimental Results From Passing Juvenile Chinook Salmon Through Archimedes Lifts and an Internal Helical Pump at Red Bluff Research Pumping Plant, Upper Sacramento River, California*," Aug. 2000, Red Bluff, CA.

* cited by examiner

*Primary Examiner*—Burton Mullins
(74) *Attorney, Agent, or Firm*—Fish & Richardson P.C.

(57) ABSTRACT

An Archimedes' screw serves as a rotor, inducer, impeller, and/or driver with motor and/or generator configurations that surround the screw by attaching to an outer cylinder of the screw. The screw acts as the motor's rotor axis with attached permanent magnets and or frame and the stator is built around the auxiliary circumference of this rotor. The rotor may also house half the bearings and can be used for the movement of fluids and/or solids, for cavitation-less drive of water vehicles, or for the generation of electrical power when the fluids become the motive force to drive the unit.

26 Claims, 11 Drawing Sheets

ELECTRO-MAGNETIC ARCHIMEDEAN SCREW MOTOR-GENERATOR

BACKGROUND

This application relates to electro-magnetic motors and generators, and more particularly to electro-magnetic drive systems for motors and generators.

The Archimedes' screw, also known as an Archimedean screw or water screw, has been used for thousands of years as an efficient method of raising water. Believed to be the design and invention of Archimedes' of Syracuse (circa 287–212 B.C.), these devices have been designed usually with one to 8 blades and powered by humans, animals, water, or electricity since that time by applying power to the center cylinder of the water screw. Typically, the normal course of driving an Archimedes' screw is to power the rotor/central shaft forming the axis. However, some ancient drawings indicate a design where a water wheel is used to drive a gear that drives an Archimedes' screw.

If energy and water crises are brought on by the continued growth and urbanization of the population, the need for more efficient pumps for fluids and solids, and for more efficient hydrogenation may become increasingly important. Moreover, there is currently a need to provide biologically friendly solutions to the use of our much-needed dams.

Currently, the use of inner cylinder driven Archimedes' screws to lift water is gaining in popularity because of the biologically friendly nature of the device and its energy efficiency. At Red Bluff Calif., a crisis with the Winter Chinook Salmon required lifting the gates of the diversion dam (Red Bluff Diversion Dam, or RBDD) to facilitate the passage of the Winter Chinook to their breeding grounds. The DOI (Department of the Interior) had already instituted a fish ladder but, according to Max Stodolski of RBDD in an on-site conversation Jun. 18, 2001, the percentage of Salmon that used the fish ladder was insufficient to allow for the continued survival of the species in the Sacramento River. Most fish simply tried unsuccessfully to follow the scent of the water leaking through the gates and died a week or so later having been unsuccessful at breeding.

The DOI installed a facility to raise the water to acceptable levels and tested two large Archimedes' screws to see if they would safely allow the passage of Salmon. The test results showed that less than 2% of the fish passed through the water screws died subsequently, even though they were first assessed, then forced into the water screws through a 12" pipe, then screened, penned, separated, counted, and again assessed, all of which increases the likelihood of death. The DOI now accepts the concept that Archimedes' screws are fish friendly.

In 1839 John Ericsson invented the "screw" propeller for use on ships he was designing with steam engines. The power of the screw was recognized as an efficient way to translate the energy from the rotating shaft to propel the ship. The debut of the screw propeller on the USS Monitor and the subsequent success has made it one of the most enduring and useful inventions of mankind. The same, basic design is still being used at the beginning of the 21 st century. However, it is a truncated Archimedes' screw without the outside cylinder, and rounded blades.

SUMMARY

Implementations of the systems and techniques described herein may include various combinations of the following features.

In one aspect, an apparatus includes a rotor defining a helical internal chamber, a plurality of magnets coupled with the rotor to create a magnetic field surrounding the rotor, and a housing surrounding the rotor, the housing having a variable electro-magnetic force element immersed in the magnetic field. The rotor may include a cylindrical portion containing a screw having a thread that extends laterally entirely to an inner wall of the cylindrical portion and longitudinally for a full length of the cylindrical portion. The cylindrical portion need not reach the full length of the rotor. The screw may have multiple threads or blades. The apparatus may also include one or more bearings, where a first portion of each bearing may be retained by the rotor and a second portion of each bearing may be retained by the housing.

The apparatus may also include a spacer coupled between the rotor and the plurality of magnets such that the plurality of magnets are coupled with the rotor through the spacer. The spacer may be a solid ring coupled with an exterior surface of the rotor. Alternatively, the spacer may be a lattice coupled with an exterior surface of the rotor. The spacer may be designed for thermal reasons, structural reasons such as those related to the materials used in the rest of the apparatus, mechanical reasons such as spacing to fit a particular structural design, and/or electromechanical reasons such as those related to power requirements.

The plurality of magnets may be oriented perpendicular to the rotational axis of the rotor. Alternatively, the plurality of magnets may be oriented parallel to the rotational axis of the rotor. The stator may be cast metal, one or more printed circuit boards, or wire windings. The variable electro-magnetic force element may be wire windings. The apparatus may be used in many different applications, including as a pump/generator/fish ladder for a dam, as a drive system for a boat or ship, as a vortex generator for wind generation systems, as a fan to move gaseous mater, or to move liquids or solids. Many materials may be used to construct the housing as well as the rotor depending upon the particular application and associated engineering requirements.

In another aspect, a system includes a rotor that includes an Archimedean screw and a plurality of magnets, and a stator rotatably coupled with the rotor, wherein the rotor resides inside the stator. The Archimedean screw may have more than one blade. The rotor may include a spacing structure, the Archimedean screw may be coupled with the spacing structure, and the plurality of magnets also may be coupled with the spacing structure, such as a lattice connecting an exterior surface of the Archimedean screw with the magnets. The plurality of magnets may be axially magnetized permanent magnets oriented in a parallel arrangement. The rotor may include a first end and a second end that are both submerged in a liquid, such as when the system is used as a generator in a dam. Moreover, the system may include end caps to prevent loss of magnetism to a surrounding area.

In yet another aspect, a method of using an Archimedes' screw includes using the energy from a flowing fluid to rotate the rotor, capturing induced magnetic flux using an electro-magnetic force element, and generating energy from the captured induced magnetic flux. A fluid can be allowed to pass through a rotor comprising an Archimedes', screw, magnetic flux can be captured using an electro-magnetic force element, the magnetic flux being induced by motion of the rotor resulting from the passing fluid, and energy can be generated from the captured induced magnetic flux. Energy may be periodically used to reverse a flow of the fluid passing through the Archimedes' screw to pump the fluid back through the Archimedes' screw.

The fluid may be water. Energy may be periodically used to slow a flow of the water to allow fish to pass through the Archimedes' screw, which may be coupled with a dam, against the flow. Allowing the fluid to pass may involve allowing suspended solids to pass through the rotor to provide on-going sediment flushing.

Alternatively, the fluid may be atmospheric air, and the method may further involve driving the air using the Archimedes' screw to create a vortex before using the generated vortex to drive the Archimedes' screw to generate power from the captured induced magnetic flux.

Additional features and advantages will be apparent from the description and drawings, and from the claims.

DRAWING DESCRIPTIONS

In the following figures, various components, such as the outer cylinder of the water screw in some figures, are drawn transparently to reveal internal details.

Figure 1:
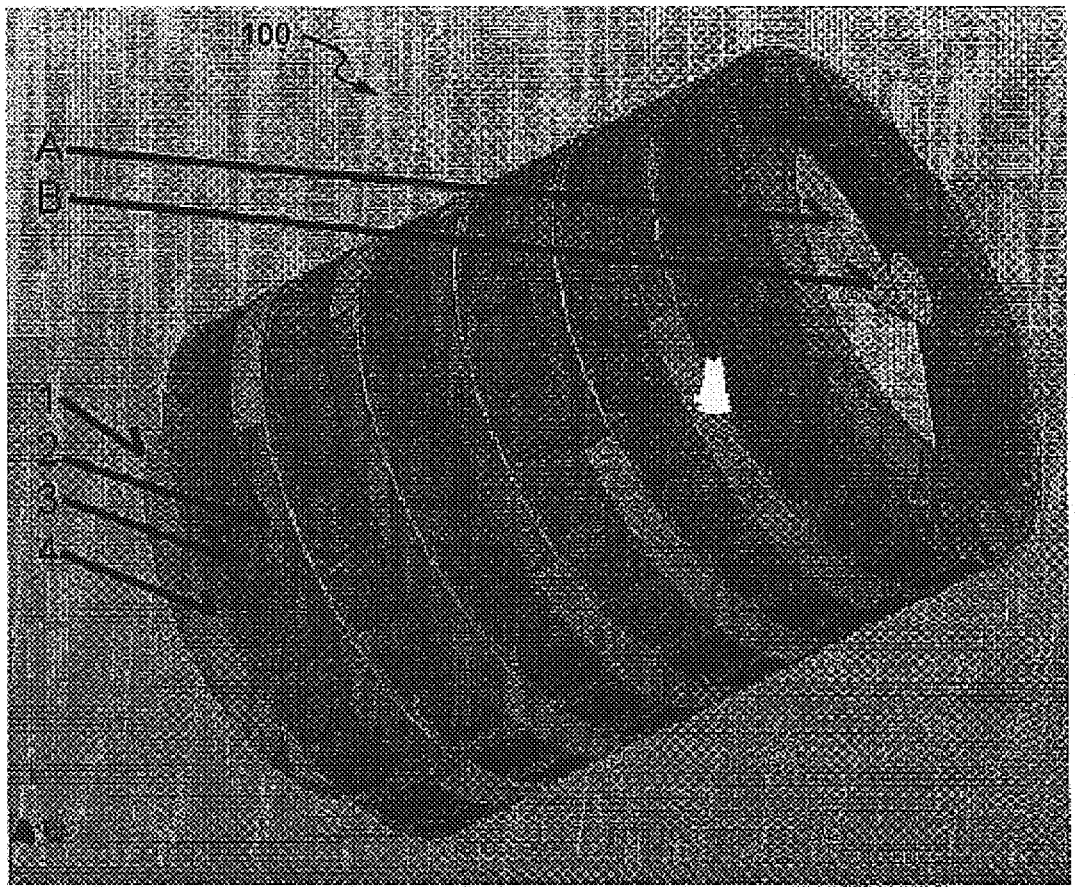
FIG. 1 is a perspective view of an example Archimedean screw apparatus having electro-magnetic elements coupled with an Archimedean screw's external surface.

Details of one or more embodiments are set forth in the accompanying drawings and the description below.

DETAILED DESCRIPTION

An Archimedean screw having electro-magnetic elements coupled with the outer cylinder axis to power the devices or receive power when the device is driven by pressure is described. The device may be designed with one or more helical blades pitched at appropriate angles for a specific use as well as different configurations of motor/generator designs including axial field or radial field designs. These designs may include a plurality of elements such as winding, or stator components, and arrays of permanents magnets.

By placing the motor/generator on the outside cylinder, the rotor/water screw can be used as a straight flow through passageway without chopping the fluids or solids going through. This may provide mechanical, electrical, and biological efficiencies.

Mechanical efficiencies may result because this is a direct drive system where the impeller can be directly in contact with the magnets, and because the water flow is straight through with no changes in direction, therefore conserving energy normally used to change the direction of flow through other pump designs. According to Newton's Laws, each change of direction uses energy because matter is accelerating in a different direction. A typical hydro generator pulls water down a penstock, which then wraps around the generator blades, thus changing direction continuously by moving it in a circular direction around the perimeter. The water passes through the blades, which changes the water's direction again, then exits down the generator shaft and out through a runner, which also changes the water's direction.

Newton's first law states that in the absence of external forces, motion in a straight line and at constant speed continues indefinitely. The externally applied forces in a traditional hydro generator are created by the shape of the pipes which alter the direction, incurring Newton's second law: when a force is applied to an object, it accelerates. The acceleration is in the direction of the force and proportional to its strength, and is also inversely proportional to the mass being moved. Thus, water wants to continue to move in a straight line as dictated by its own motion caused by gravity but it cannot in a traditional generator; the water is accelerated in a different direction, by the penstock shape, losing motive force before it ever gets to the generators from the penstocks. The vectors of force applied to accelerate the water around then through the typical generator causes it to lose some of the motive force the generator could have otherwise used and converted it into electrical energy. This motive force is caused by gravity acting on the water to accelerate it down the penstock. When it is accelerated in a different direction, it loses velocity. This translates directly into a reduction of power. So, when the engineers state that a generator is 98% efficient, they are speaking only of the efficiency of the force delivered to the generator and not the force available through the entire system.

Similar situations are true when applied to pumps. The typical centrifugal pump draws water directly toward the axis of the motor where it meets the impeller changing its direction of flow radially from the axis, then the impeller casing confines this motion, creating the pressure it needs to direct the flow around the impeller and out to the attached pipe or hose, as the case may be.

Electrical efficiencies of the present application can be seen partly in the mechanical conservation of energy, which translates directly into less energy to drive the unit when used as a pump, or more energy out of the unit when used as a generator, and in other design characteristics. For example, an axial field design can result in specific energy efficiencies caused by the cumulative effects of magnetic flux permeability. When magnetic poles are aligned, the magnetic force is additive in nature, thus increasing the force available for induction into the stators. Radial field generators may be desirable in certain situations as well. Electrical efficiency of this design can also be seen when used to pump fluids that are ambient temperature or lower, since a cooling fan is not needed. The cool liquid being pumped can act as a rather volumetrically enhanced heat sink at the center of the device, so, where heat is most critical, the pump provides its own heat sink.

Biological efficiencies can be seen in the ability of fish to transverse the water screw in both directions, without injury. This can be crucial to the continued survival of numerous species of fishes, such as Salmon, and constitutes part of the biological efficiencies. Other efficiencies exist in the biological domain, including not damaging other organisms that pass through, and passing sediment, which can preserve both up stream and downstream streambed ecologies.

In addition to uses in traditional dam-based power generation, the present application has other important uses as well. The current energy situation is such that maximal usage of any fluid fall of substance may be helpful. The ability of this device to be scaled to any size allows users to develop generator applications such as sewage outflows and street drains, amongst others.

The systems and techniques of this application can also be used to power boats. Fast ship technology is currently being developed that requires significant energy output by the drive unit to power ships at higher speeds. Motors using the systems and techniques of this application have the ability to deliver more energy and apply it to the water to drive ever more powerful ships without cavitation associated with the acceleration (positive or negative) of large vessels, thereby enabling achievement of speeds faster than with conventional drive systems. A greater time/rate change of position of the water can be achieved because of the long continuous blades of the water screw and the lack of blade edges where cavitation takes place. This application of the systems and techniques described here are detailed further below.

The water screw acts as a non-destructive propeller lacking the destructive cutting action of other pump/generator devices such as turbine blades, water wheels, propellers and impellers used in many devices. The water screw is generally less destructive to biological or structural entities that enter the pump/generator and exit in the flow of materials that pass through. The ability to use the outside cylinder of the water screw enables energy economy by designing straight through flow operations, thus reducing energy needed or lost by changes in direction of the materials being moved or providing the kinetic energy to drive the units.

The present application describes an improved pump motor/generator with straight through drive/propeller/impeller capabilities having a reduced number of moving components and higher efficiency than traditional drive/pump/generators. This is achieved by coupling the permanent magnets, or their support structures, to the outside cylinder of an Archimedes' screw. Efficiencies are achieved by the straight flow through design, as well as by the motor/generator being integral to the water screw. These efficiencies are generally governed by external parameters of length and slope as well as internal parameters of radius, pitch, and number of teeth so pitched.

Instead of having the top of the water screw open to facilitate the exit of a material being transported, as in traditional Archimedes' type water screw applications, both ends of the water screw can be closed or submerged with respect to the transported material. The advantages of closing or submerging both ends include: (1) enabling closed ended straight flow through submerged pumps; (2) enabling closed ended straight flow through or submerged hydrogenerators; (3) enabling the water screw to replace current propeller technology in water vehicles; (4) enabling fish to transverse a hydro generator so constructed, and (5) enabling flow through of gaseous materials such as in a vortex generator or fan for different gasses.

The advantages of attaching or embedding a magnet array on the outer cylinder include: (1) enabling highly efficient axial field motor/generator designs; (2) enabling radial field motors to be designed if needed; (3) enabling a frame attachment to separate the magnets from the outer cylinder of the water screw when desired for thermodynamic or other engineering reasons; (4) enabling a frame attachment to separate the magnets from the outer cylinder of the water screw when desired for mechanical reasons such as spacing to fit to a particular structural design; and (5) enabling a frame attachment to separate the magnets from the outer cylinder of the water screw when desired for electromechanical reasons such as enlarging the radius of the motor/generator to accommodate power requirements.

By driving the water screw from the outside cylinder, the entire hollow screw structure becomes a passageway free of occlusions for the passage of anything entrained therein. For instance, where a solid material entrains into a typical pump device having a static outer casement and a moving impeller, the material can become lodged between the casement and impeller and cause damage or jam the device. Also, biological organisms entrained into devices such as this have a high likelihood of being killed or damaged according to their size relative to the device. Once entered into a device of the present application, where the drive unit is attached to the outer cylinder of the water screw, any material that completely enters can pass safely through since the inside of the water screw is a passageway which contains no moving components.

Elimination or reduction in the angular change of direction water experiences as it passes though a hydroelectric generator decreases the energy required of pumps and increases the energy available to the plant in hydro-generators. According to Newton's laws, this can increase the total energy available for hydroelectric power by this savings alone as well as all other applications, which in pumping translates to energy savings per volumetric/gravimetric unit pumped.

The parallel arrangement of axially magnetized permanent magnets allows the magnetic permeance to add to a greater number than radial arrangements particularly when there are at least four modules in sequential arrangement. The formula is: Pm=P1+P2+P3+P4 . . . and so on. This is where much of the efficiencies in energy come from and where the present application significantly differs from other designs, especially large generators that are nearly universally radial field generators. The completed design can use end caps to return accumulated magnetism to the next field over and to prevent loss of magnetism to the surrounding area, thus enhancing the power of the motor/generator. Axial field motors/generators can be highly efficient in both modes of operations and, when designed carefully with new technologies, can be highly efficient through their entire operating range.

Current hydro-generators typically operate at highest efficiency only in a very narrow range. In hydro-generation at dams, such as the Grand Coulee Dam, this means that water is spilled annually during the rainy season as the water influx exceeds the capacity of the generators. Grand Coulee has the spillway capacity to spill 1,000,000 cubic feet per second. This represents a huge loss of power at peak spill. Passing dam water through the spillway is a loss of revenues to the plant, since lost water means lost potential kinetic power to drive the generators. A more efficient motor/generator with straight flow through capabilities and variable speed capabilities can allow for safe fish passage down stream and, in low head dams, safe fish passage upstream while normal power is being generated.

In certain situations, using a frame around the outside of the water screw is desirable. For example, if the water screw becomes excessively hot during operations moving a heated material it may be desirable to thermally separate the motor/generator. Such thermal separation can be used in oven applications or in moving hot fluids. In addition, in certain structural situations, it may be desirable to expand the diameter of the generator for the convenience of the engineers, for instance, where linear dimensions are limited. Moreover, in certain situations, spacing frames can be used where structure and pressures determine that a larger diameter may be optimal, such as when power considerations are addressed. Such frames or spacing structures may be thick or thin, solid, or open according to the needs of the design.

There may well be situations where, because of structural or space considerations, a single, relatively wide bearing may be desired. The external cylinder allows for this by providing a large cylinder for the inner housing of such a bearing. This utility allows for those situations that may demand a single relatively large bearing surface but also, multiple bearings may be employed in very large devices where support is warranted by the mechanical stresses of the situation in which the device is employed.

In certain motor/generator applications it may be preferable to use a cast metal stator as opposed to traditional wire windings. The induction of EMF (electro-magnetic force) to the magnets, or, conversely, the induction of large amounts of current into the stator can benefit.

The Archimedean screw design described here may be scaled to all needed sizes of water pumps with great efficiency. A water screw generally has the front end (load end) submersed in fluid to begin operations (i.e., it is not self priming). In those situations where this is possible, there may be no limit to the scalability of this device beyond the engineering capabilities to build large or small units. Thus, small, large, and very large generators employing the systems and techniques described herein may be constructed wherever there is a change in the height of water or other fluid available.

There are thousands of small dams where energy can be created inexpensively as well as large dams, such as the Grand Coulee with its record as the largest producer of power in the world with 6,180 megawatts of power generating capacity. Yet even the new turbine generators, which pass catadromous fish somewhat safer than the old chopping design, cannot match the fish friendly technology inherent in the water screw designs described herein.

Additionally, this device, unlike the large turbine designs, can be reversed, without building an additional motor to do so, to allow for anadromous fish traffic and do not have the biological problem of blades chopping through the water at high speeds. In many applications, a reversible motor/generator is highly desirable. At locations such as the San Juan pump/generating station, the current hydro-generators were modified with separate motors to allow the dam to pump water against the gradient for storage during low electric demand times. This allows for the storage of potential energy for use during high-energy demand times. Yet this is double jeopardy for the unlucky fish that are forced to go through the chopping action of the current generator/pump technology multiple times.

The present design can be implemented with an appropriate motor controller to allow the option of reversing the water screw for such uses with its concomitant safe fish passage. Additionally, in tidal generation where the force of the tide reverses four times daily, this design can be used to generate power in both directions without redirecting the water through an opposite facing generator. Such a system can be implemented to reduce added infrastructure costs during development.

On high-head dams, a hydro generator employing the systems and techniques described herein may be slowed, or reversed to the point that the water flow remains in the downstream direction, which relates directly to the fishes instincts to swim upstream, but where the water is slowed to the point that fish, such as Salmon, can continue through the dam. This is accomplished with the systems and techniques described herein without the use of expensive fish passage devices, all of which have drawbacks and limitations, and many of which pull the fish in a "downstream" flow direction, which the fish naturally resists as it is against its nature to swim downstream at this point in its breeding cycle. By using this device, the natural instincts of the fish cause it to entrain itself willingly into the water screw and safely pass through without further damage. Additionally, with this device, when used in such a manner, water is reserved for future use or use in other parallel generators while the flow is slowed.

Fish desiring to swim upstream (e.g., anadromous fish) can navigate up the water screw by one of the following several scenarios: in small head dams (e.g., Lower Granite Dam in Washington or Bonneville Dam in Oregon), the salmon can simply swim up; in medium head dams (e.g., Russell Dam, Ga., Stockton Dam, Mo.), the generator may be slowed in selected generators to allow the fish to navigate up stream; in large head dams (e.g., Grand Coulee Dam, Grand Coulee Wash.; Hop Brook Lake, Conn.; Hoover Dam, Nev.), the device can be reversed and water slowed to the point where the fish can entrain into the water screw to pass through the dam; however, all the energy is not lost since the water backed up by this slowing can be used to generate energy by the other generators.

Fish desiring to swim downstream (e.g., catadromous fish such as the American Eel, as well as juvenile Salmon and Atlantic Salmon which swim up and down the river numerous times in their life) can navigate down the water screw. Currently many fish are chopped by the spinning generator blades of traditional generator technology since fish are suspended in the water being chopped. Even new proposed designs using screw shaped blades propel the fish toward the blade at an angular direction and have a greater chance of harming the fish. Such new proposed designs can also completely prevent anadromous fish traffic. With the present design, the water screw blades can be presented directly to the water body behind the dam, thereby avoiding fish being propelled toward the blade at an angular direction, which can result in few or no fish being killed by the generator.

Dams are subject to sedimentation build up. This happens when fast moving stream water is slowed on entry to the lake behind the dam, and its sediment carrying capability, provided by its fast movement, is removed. The sediment insidiously builds and either requires removal by dredging or reduces the water retention capacity of the dam, thus reducing its usefulness and functionality.

One dam built on the Yellow River in China silted completely in just a few years. The river is notorious for its erosion rate of 1,000 tons per sq km through the Loess plateau region, which extends for 430,000 sq km. The Sanmenxia dam in Henan province, which was completed in 1960, was eventually modified to allow for sediment flushing by opening gates in the bottom. When a high water period is anticipated, the gates at the bottom are opened to allow the sediment built up behind the dam to be flushed out. This is a huge waste of water and power.

A power generator employing the systems and techniques described herein, if installed in a dam where sedimentation reaches the dam itself, can allow power generation at the same time as allowing on-going sediment flushing as a natural consequence of such an installation.

This important aspect of the device can help future dam builders by allowing them to design a sediment flushing system directly into the hydro-power plant, thus saving time and effort and using the water's natural ability to carry sediment downstream to do so. This also has important implications to the down stream ecology. When water is clarified, or unloaded unnaturally by calm lake waters, the released unloaded water picks up more sediment down stream and erodes the stream bed, thus altering both the up stream and down stream ecology of the river to the detriment of numerous species of fish, and the food chain they are part of. By placing this device low in the dam, both problems can be mediated to a high degree, preventing excessive sedimentation and passing sediment safely down stream. When sediment is passed down stream, downstream erosion can be decreased, thereby preserving the stream bed in a more natural state needed by many egg-burying fish species and other bottom dwelling animals.

The truncated screw propeller invented by John Ericsson was an excellent design for use with traditional ships' drive units, such as steam engines. However, when excessive power is applied, the screw propeller causes cavitation. Cavitation causes destructive vibration in the mechanisms causing it which translates to faster wear, higher maintenance cost, increased frequency of replacements, and wasted energy which is often converted into noise.

Even modern propellers with multiple blades and complex blade designs have not been able to fully prevent cavitation. Some are moving toward enclosed blades, which have moderated the cavitation to some degree. The applicant has directly observed large ships (e.g., nuclear aircraft carriers) cavitating when the ship rests at full stop, then powers up to accelerate to top speed in sea trials. The bubbles caused by this cavitation streamed to the rear of the ship from all of the ship screw propellers. Cavitation is the result of water undergoing a time/rate change and passing over a surface of the propeller in such a manner that the vapor pressure of the water is reached resulting in bubbles, or boiling of the water.

This can happen in several places on a typical screw propeller. The most common form of cavitation of is tip cavitation, or tip vortex cavitation. This type of cavitation should not occur with a complete water screw as described in the present application.

Root cavitation is another type that may be prevented by the systems and techniques described herein. Root cavitation is caused by the inability of the water to move around the vessel in sufficient amounts to satisfy the energy requirements of the propeller because of the shaft and hull design required to support the shaft.

Face sheet cavitation, sheet cavitation, cloud cavitation, and leading edge cavitation can also be eliminated because of the amount of surface area available to accelerate the water in the present design. Hub cavitation remains, but leading and trailing hub design specifications can eliminate that as well. The time/rate pressure change is reduced below the vapor pressure of the water.

At the edge of this is a small pocket where the two water speeds meet and a vacuum is formed. In this vacuum, if the pressure decreases sufficiently, the water boils, or looses gasses. The production of vapor pockets and their subsequent collapse is cavitation. Cavitating conditions exist primarily in non-axisymmetric flows where there is a rate of change difference in two areas of the water. The axial flow of the Archimedean screw design of the present application can obviate almost all possibility of cavitation, when properly designed and applied.

In addition to surface vehicles, the systems and techniques of the present application can be applied to new fast ship technology hull designs. Fast ship technology is the utilization of hull design to eliminate the age-old problem of ships creating a captive wave, which prevents rapid movement across the water surface. Power plants in ships are designed to provide adequate power for the traditional ship hull design where an engineer can use a specific height/length ratio to tell you how fast the ship should be able to move. The new technologies can enable ships to move across the surface at greatly increased speeds, but they need drive units that can propel them much faster than current propeller technology.

The device described herein is such a technology. By allowing more water to be moved at a faster rate, the new fast ship technology can take advantage of this design, including the reduced cavitation benefits.

Military submarine technology currently uses the same propeller technology that was developed for the first human powered attack submarine to sink a Union ship in the Civil War. The only difference is the efficiency of the propeller, the materials, sizes, and power plants used. The present application can answer the question of how to stop and start a submarine rapidly without cavitating.

Everything from fruits and vegetables to coal can, and often does use large screws as a method of movement. Often this is done with an open screw moving the solids along a straight crescent shaped path open at the top and driven by powering the screw at the end of the inner cylinder.

The systems and techniques described herein allow for other designs to move solids where the end may be closed, and also provide novel methods for many uses of Archimedes' screws. These methods may uses axial or radial field motors built around the outside of the outer Archimedean screw cylinder either by direct attachment, or by indirect attachment using a spacer to position the magnets, which form part of the rotor, away from direct contact with the outer cylinder. Thus the Archimedes' screw becomes the shaft of the rotor for the motor.

Any configuration of an Archimedes' screw wherein the screw blades are encased by an outer cylinder may be used as the rotor for this device. The power of the Archimedes' screw to drive or be driven in certain volumetrically specified manners is determined by the number and pitch of the screw blades as well as the overall size of the individual screw components, its length and diameter. By using the outer cylinder as the driving location, the diameter of the inner cylinder can be decreased, conserving materials, space, and weight.

Since the ability of the screw to move materials or to be moved by materials is dependent on the surface area of the blades pushing on or being pushed on, the larger the Archimedean screw, the more power it can have. The design of the motor has similar characteristics. By matching the design of the Archimedean screw and motor for the specified use of the machine, various economies can be achieved.

The outer cylinder is used as the rotor by attaching the permanent magnets either directly to the outer cylinder by means specific to the materials used for the Archimedean screw, or by attaching some mechanical device to the cylinder and attaching the magnets to that device according to the specifications required.

For instance, if a plastic material is used for the outer cylinder of the Archimedean screw, then attaching a collar or ring to the outside cylinder may be desirable since the plastic may not be conducive to attachment by magnetic materials and may not be able to be glued to such materials. If, however, the outer cylinders are made of metallic materials, direct attachment may be called for since magnets could be designed to house female screw threads.

An axial field motor is one in which the permanent magnetic fields are oriented along the axis or parallel to the axis of the motor/generator as opposed to radially away, or perpendicular to the axis. Since motor/generator power is directly related to the ability of the magnets to induce Magnetic Flux (MF) into the variable Electro-Magnetic Force (EMF) elements (e.g., the stator), and since the power of magnets to so induce MF relates to the proximity to the stator elements and to the number of magnets lined up in a row, and since the selected rotor can provide a huge diameter, with little or no distortion of the rotor, it follows that this design allows for exceptionally close tolerances, and a wide variety of arrangements of magnet and stator designs. Some example arrangements are described in connection with FIGS. 1–8 below.

Methods for design of the stator include the use of cast metal components or printed circuit boards. On smaller motor designs, such as under 100 horse power (HP), printed circuit boards can be used as stator elements where they are also axially oriented between the magnet arrays. This allows for a very compact design and easy assembly. Multilayered boards can be used with high pound weight copper to maximize the EMF in the units.

Figure 6:
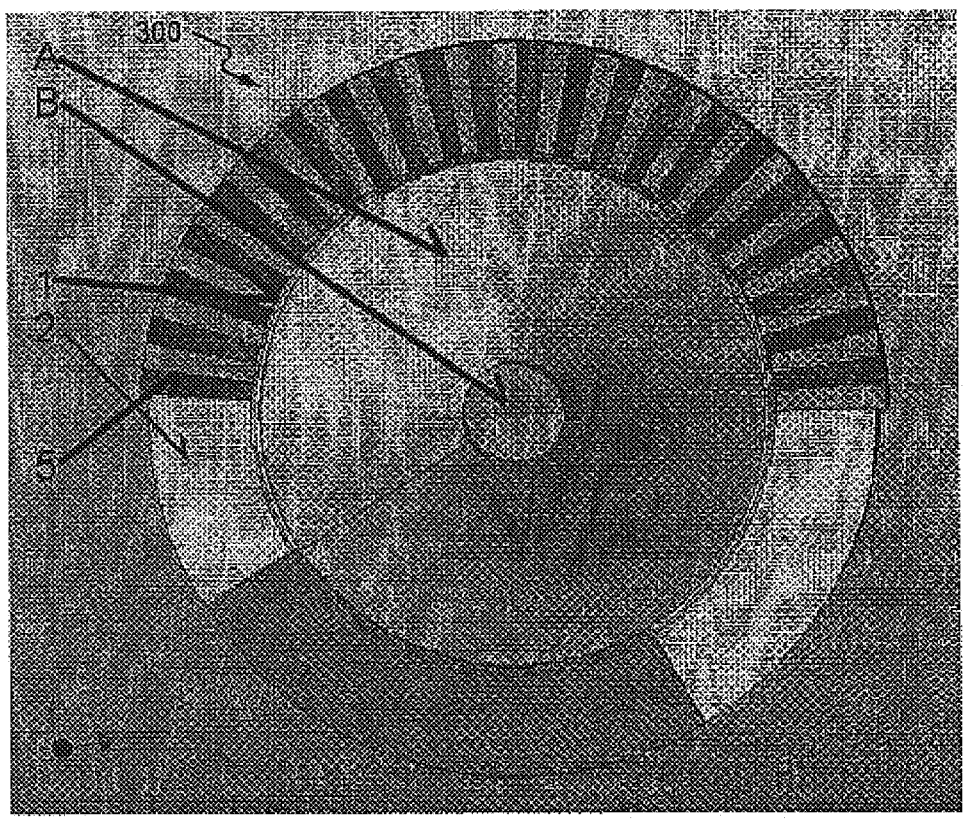
FIG. 6 is an end view of an example Archimedean screw apparatus having electro-magnetic elements coupled with an Archimedean screw's external surface.
Figure 7:
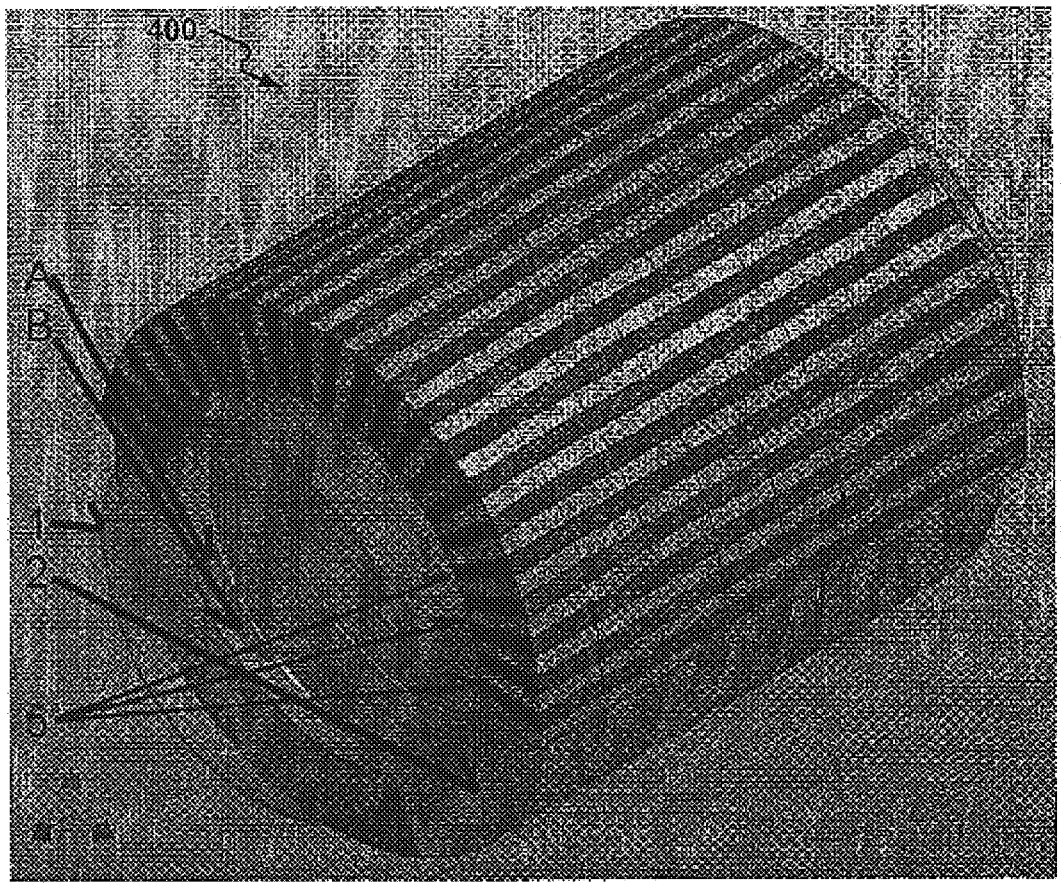
FIG. 7 is a perspective view of an example Archimedean screw apparatus having electro-magnetic elements coupled with an Archimedean screw's external surface.
Figure 8:
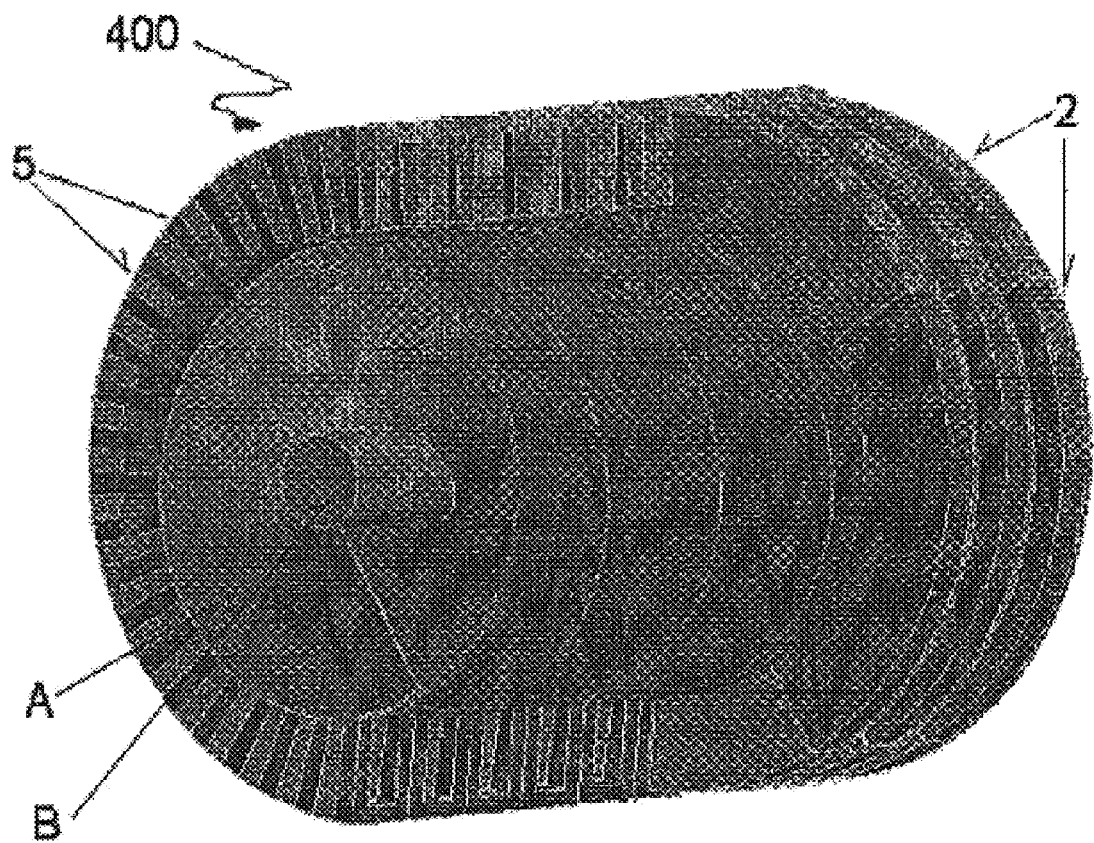
FIG. 8 is another perspective view of the example Archimedean screw apparatus from FIG. 7.

Cast metal stator components can allow for greater induction of current into the stator components, yielding higher amperage. The components can be arranged in such a manner as to minimize the lateral space between them. Since a curved surface is being dealt with, this may require tapering the components as they approach the center of the axis. The stator components can be connected only at the axial side and connected axially as shown in FIGS. 6–8 below. The illustration shows only half a stator so that the magnet arrays are revealed, and the individual elements alternate color to show one course of the connected array of stator elements so cast.

Any number of axial field motor controllers can be accommodated to operate these designs as needed.

FIGS. 9–13 illustrate radial field motors build around the outer cylinder. Radial field motors are typical in large and small motor/generators. Many different motor controllers can be used to operate this design.

Frame spacers can be used to position the magnets around the unit in the precise position required by the design. For instance, in a dam where there may be limited space available in certain places, this allows for a greater radius, which can require less length to develop the same power application. The spacer frame elements may be any size or material suited for the particular design as different configurations are ordered.

FIG. 1 is a perspective view of an example Archimedean screw apparatus 100 having electro-magnetic elements coupled with an Archimedean screw's external surface. Referring now to FIG. 1, reference letter A points to an Archimedes' water screw, and reference letter B points to an inner cylinder of the water screw. Reference numeral 1 points to an outer cylinder (drawn transparently) of the water screw, which holds permanent magnets. Reference numeral 2 points to the permanent magnets with alternating poles. Reference numeral 3 points to EMF coils. Reference numeral 4 points to EMF coil supports (drawn transparently).

Figure 2A:
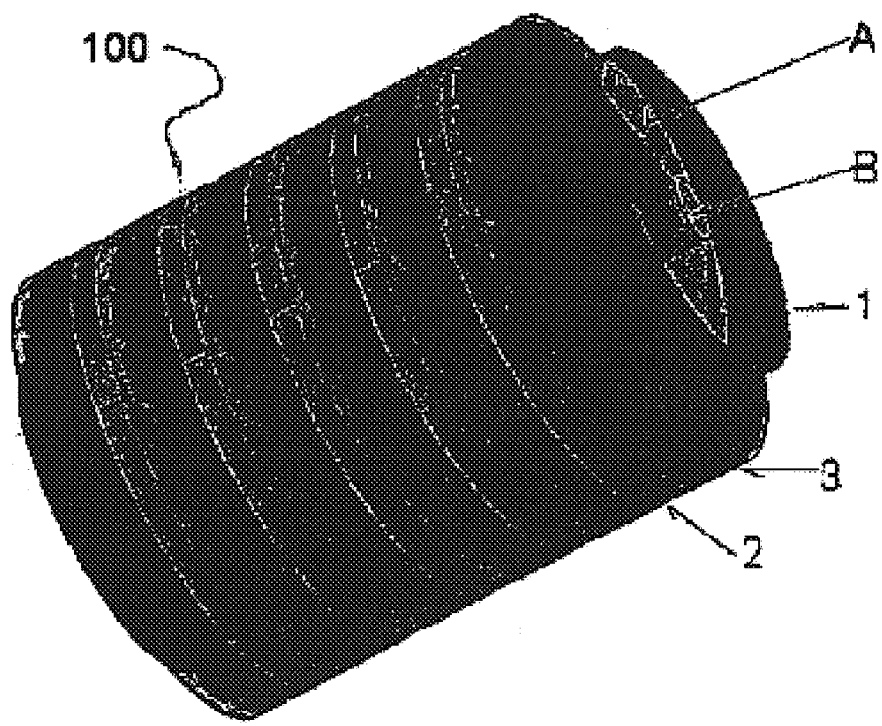
FIGS. 2A & 2B are perspective views of the example Archimedean screw apparatus from FIG. 1.
Figure 2B:
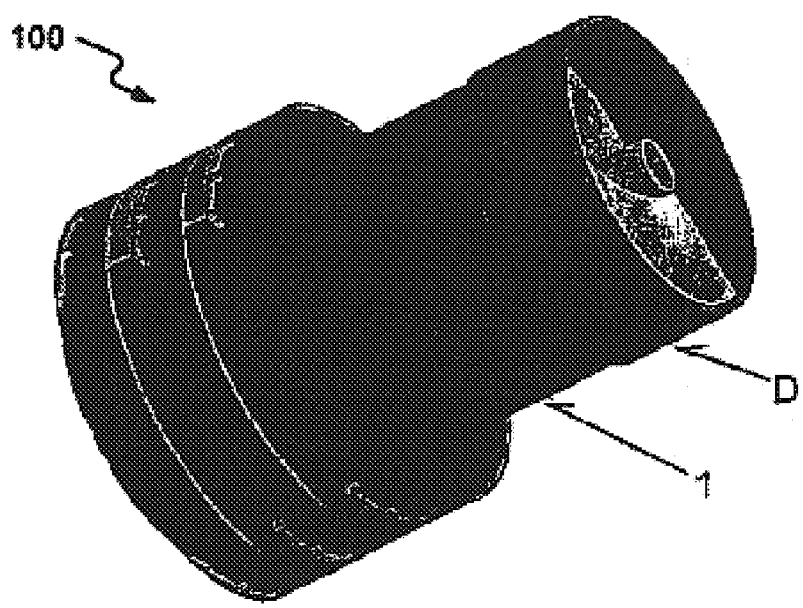

FIGS. 2A & 2B are is-a-perspective views of the example Archimedean screw apparatus 100 from FIG. 1. Referring now to FIG. 2A, the outer cylinder 1 of the water screw in FIG. 2A is no longer drawn transparently. The Archimedes' water screw A, the inner cylinder B, the magnets 2, and the coils 3 are shown. Referring to FIG. 2B, a portion of the magnets and coils are removed to assist in showing a bearing D that is integral to the rotor. The outer cylinder 1 of the water screw forms at least a portion of the bearing D, as described above in paragraph 48 (e.g. the bearing D can be a relatively wide bearing that has a first member built into the outer cylinder 1 of the water screw).

Figure 3:
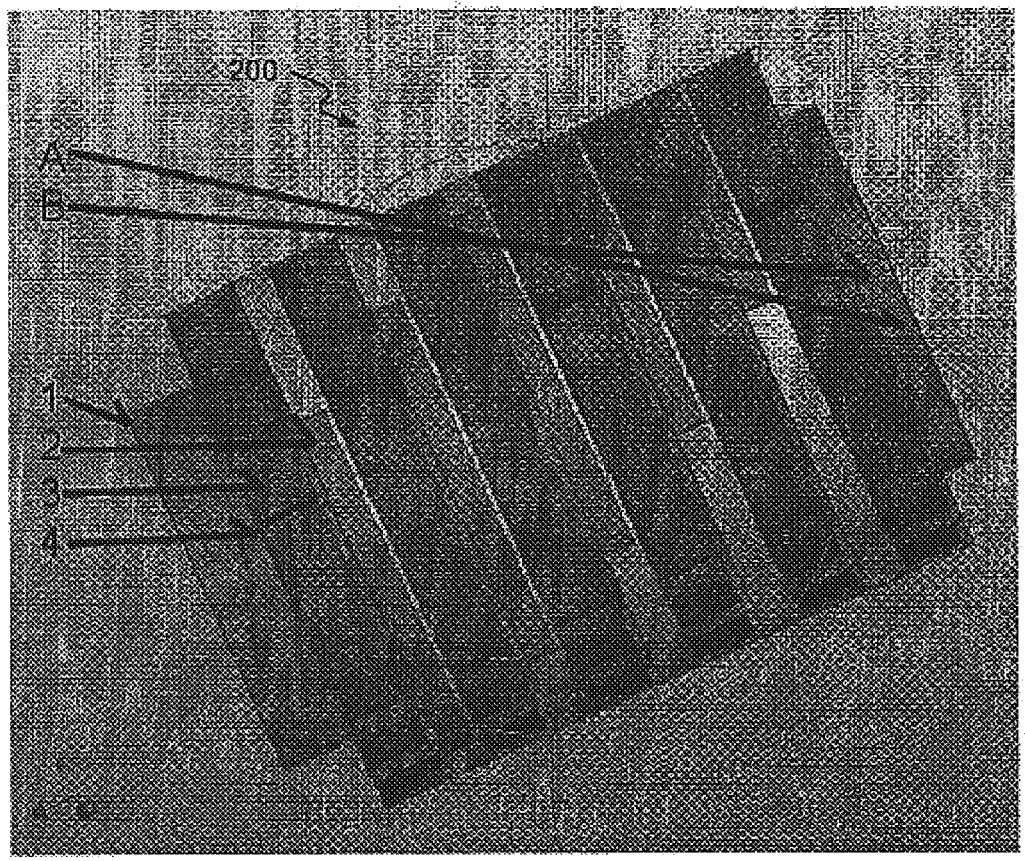
FIG. 3 is a side view of an example Archimedean screw apparatus having electro-magnetic elements coupled with an Archimedean screw's external surface.
Figure 4:
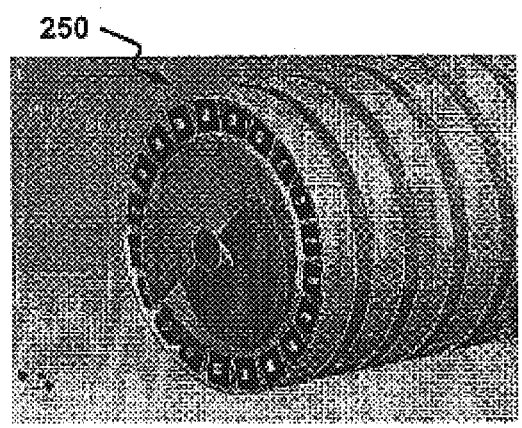
FIGS. 4 and 5 are perspective views of example Archimedean screw apparatus having electro-magnetic elements as in FIG. 3 but having two and four blades respectively.
Figure 5:
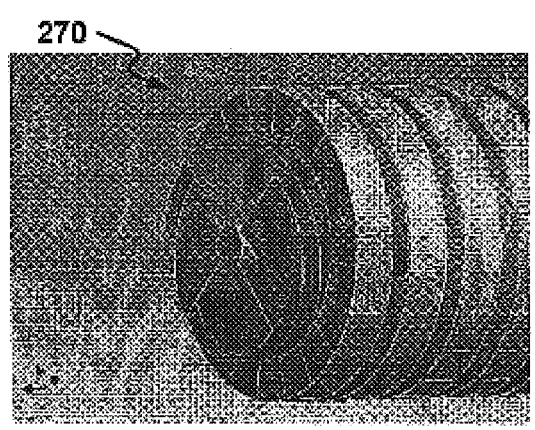

FIG. 3 is a side view of an example Archimedean screw apparatus 200 having electro-magnetic elements coupled with an Archimedean screw's external surface. Referring now to FIG. 3, reference letter A points to an Archimedes' water screw, and reference letter B points to an inner cylinder of the water screw. Reference numeral 1 points to an outer cylinder (drawn transparently) of the water screw, which holds permanent magnets. Reference numeral 2 points to the permanent magnets with alternating poles. Reference numeral 3 points to EMF coils. Reference numeral 4 points to EMF coil supports (drawn transparently). FIGS. 4 and 5 are perspective views of example Archimedean screw apparatus 250, 270 having electro-magnetic elements as in FIG. 3 but having two and four blades respectively. The coil supports are drawn opaquely in FIGS. 4 and 5.

FIG. 6 is an end view of an example Archimedean screw apparatus 300 having electro-magnetic elements coupled with an Archimedean screw's external surface. Referring now to FIG. 6, reference letter A points to an Archimedes' water screw, and reference letter B points to an inner cylinder of the water screw. Reference numeral 1 points to an outer cylinder of the water screw, which holds permanent magnets. Reference numeral 2 points to the permanent magnets with alternating poles. Reference numeral 5 points to cast metal stator elements. Only half of the stator is shown so that the magnets 2 can be seen.

FIG. 7 is a perspective view of an example Archimedean screw apparatus 400 having electro-magnetic elements coupled with an Archimedean screw's external surface. Referring now to FIG. 7, reference letter A points to an Archimedes' water screw (drawn transparently), and reference letter B points to an inner cylinder (drawn transparently) of the water screw. Reference numeral 1 points to an outer cylinder (drawn transparently) of the water screw, which holds permanent magnets. Reference numeral 2 points to the permanent magnets with alternating poles. Reference numeral 5 points to cast metal stator elements. In this view, slightly less than half of the stator is shown so the magnets 2 can be seen. The stator components here may be connected at the outer cylinder of the screw so a straight through flow of power can result.

FIG. 8 is another perspective view of the example Archimedean screw apparatus 400 from FIG. 7. Referring now to FIG. 8, the Archimedes' water screw A, the inner cylinder B are shown, the magnets 2, and the stator elements 5 are shown. The outer cylinder of the Archimedean screw and portions of the magnets 2 and the stator elements 5 have been cut away.

Figure 9:
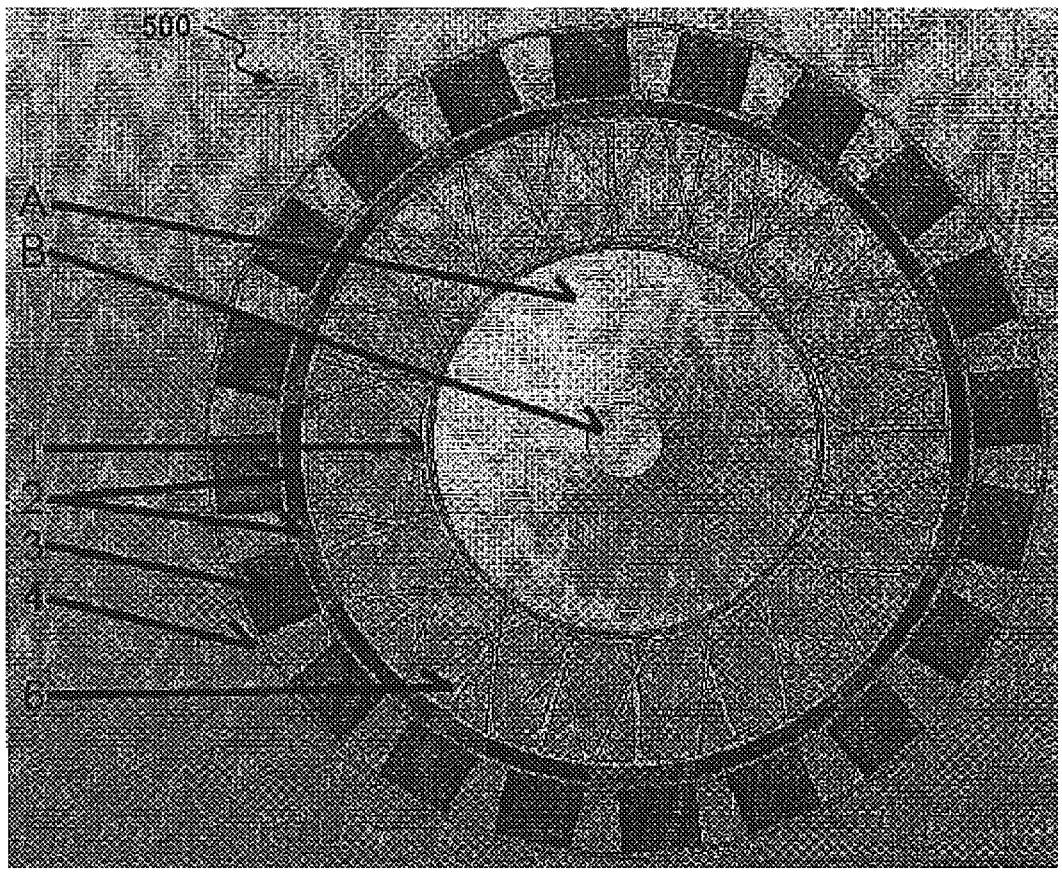
FIG. 9 is an end view of an example Archimedean screw apparatus having electro-magnetic elements coupled with a frame, which is coupled with an Archimedean screw's external surface.

FIG. 9 is an end view of an example Archimedean screw apparatus 500 having electro-magnetic elements coupled with a frame, which is coupled with an Archimedean screw's external surface. Referring now to FIG. 9, reference letter A points to an Archimedes' water screw, and reference letter B points to an inner cylinder of the water screw. Reference numeral 1 points to an outer cylinder of the water screw, which holds spacer frames. Reference numeral 2 points to permanent magnets with alternating poles. Reference numeral 3 points to EMF coils. Reference numeral 4 points to EMF coil supports. Reference numeral 6 points to a spacer or frame, which can be used to hold magnets away from the cylinder wall. The spacer or frame 6 may be solid or not, as needed to accommodate the engineering requirements of the application.

Figure 10:
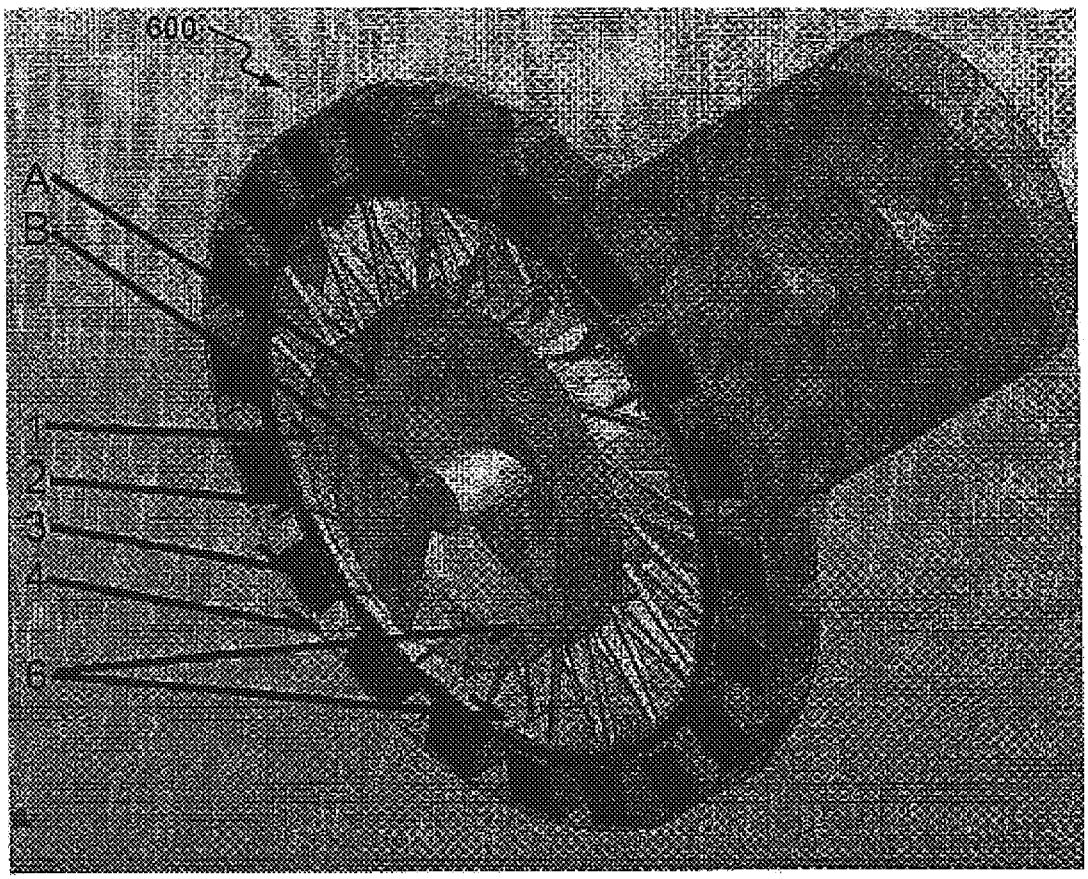
FIG. 10 is a perspective view of an example Archimedean screw apparatus having electro-magnetic elements coupled with a frame, which is coupled with an Archimedean screw's external surface.

FIG. 10 is a perspective view of an example Archimedean screw apparatus 600 having electro-magnetic elements coupled with a frame, which is coupled with an Archimedean screw's external surface. Referring now to FIG. 10, reference letter A points to an Archimedes' water screw, and reference letter B points to an inner cylinder of the water screw. Reference numeral 1 points to an outer cylinder (drawn transparently) of the water screw, which holds spacer frames. Reference numeral 2 points to permanent magnets with alternating poles. Reference numeral 3 points to EMF coils. Reference numeral 4 points to EMF coil supports (drawn transparently). Reference numeral 6 points to a spacer or frame, which can be used to hold magnets away from the cylinder wall. This view shows only one array of windings and magnets around the screw.

Figure 11:
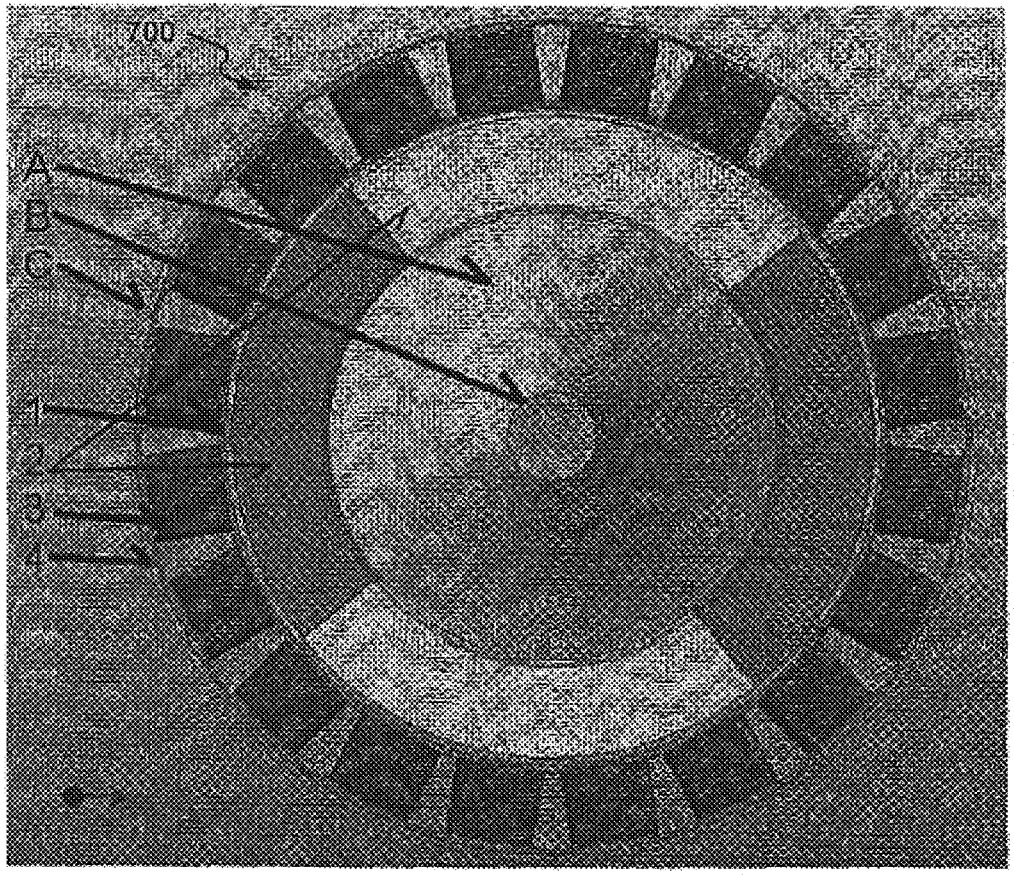
FIG. 11 is an end view of an example Archimedean screw apparatus having electro-magnetic elements coupled with an Archimedean screw's external surface.

FIG. 11 is an end view of an example Archimedean screw apparatus 700 having electro-magnetic elements coupled with an Archimedean screw's external surface. Referring now to FIG. 11, reference letter A points to an Archimedes' water screw, reference letter B points to an inner cylinder of the water screw, and reference letter C points to an outer casing, which may hold stator components. Reference numeral 1 points to an outer cylinder of the water screw, which holds magnets. Reference numeral 2 points to permanent magnets with alternating poles. Reference numeral 3 points to EMF coils. Reference numeral 4 points to EMF coil supports. This view shows only four magnets in array; however, any multiple of two magnets may be used where the magnetic field lies in a radial direction to the axis. This number should not equal the number of windings in the design.

Figure 12:
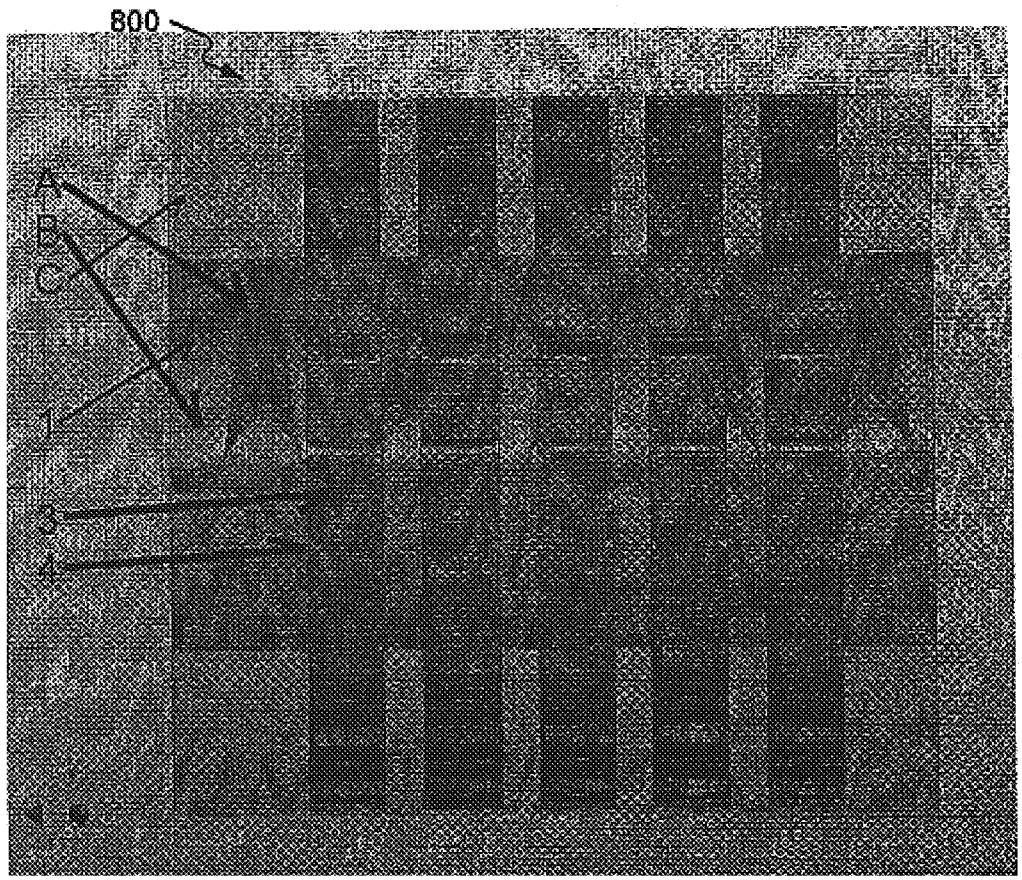
FIG. 12 is a side view of an example Archimedean screw apparatus having electro-magnetic elements coupled with an Archimedean screw's external surface.

FIG. 12 is a side view of an example Archimedean screw apparatus 800 having electro-magnetic elements coupled with an Archimedean screw's external surface. Referring now to FIG. 12, reference letter A points to an Archimedes' water screw, reference letter B points to an inner cylinder of the water screw, and reference letter C points to an outer casing (drawn transparently), which may hold stator components. Reference numeral 1 points to an outer cylinder (drawn transparently) of the water screw, which holds magnets. Reference numeral 3 points to EMF coils. Reference numeral 4 points to EMF coil supports (drawn transparently). This view shows only one array of windings and magnets around the screw. This image shows five arrays of magnets and windings. Any integer may be used as required by the design. The magnet array is found beneath the windings in this illustration. In this case, the winding and magnets are spaced as they might be in large units used in dams to accommodate the facilities present at the site. Since the design illustrates a radial field motor/generator, close tolerances on the horizontal plane are not required. The outside structure is transparent in this view.

Figure 13:
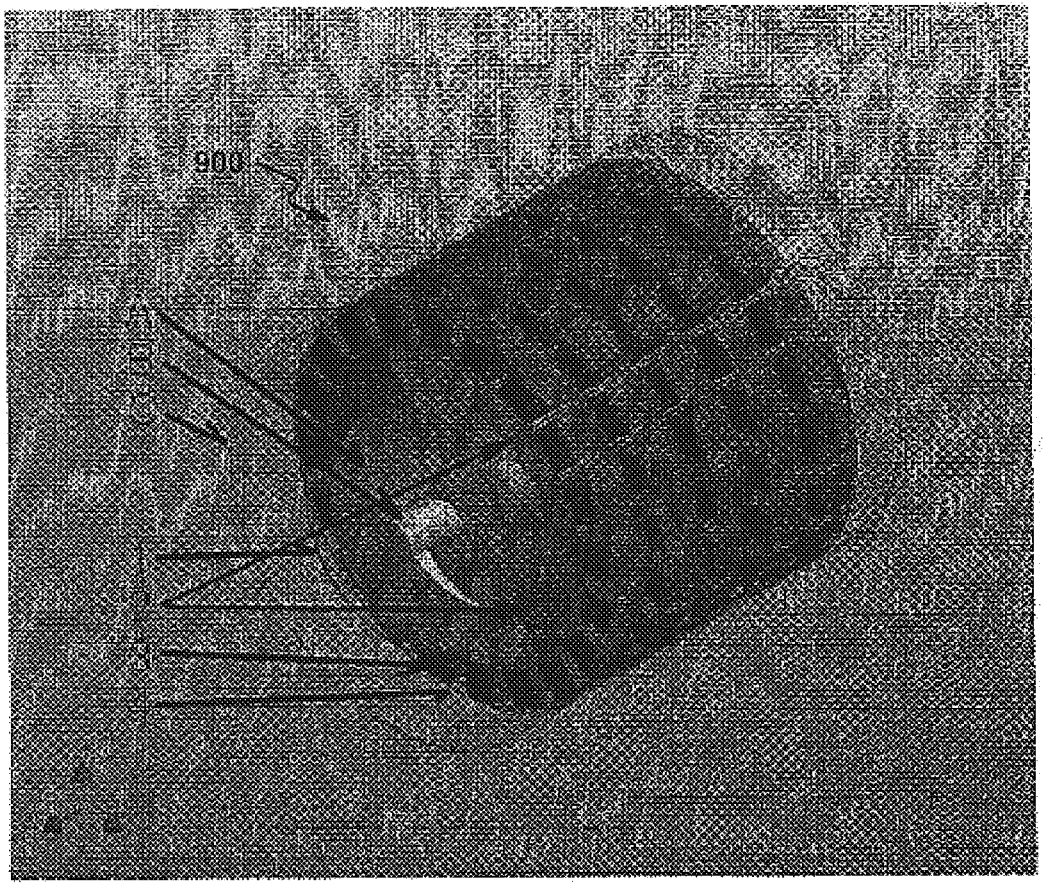
FIG. 13 is a perspective view of an example Archimedean screw apparatus having electro-magnetic elements coupled with an Archimedean screw's external surface.

FIG. 13 is a perspective view of an example Archimedean screw apparatus 900 having electro-magnetic elements coupled with an Archimedean screw's external surface. Referring now to FIG. 13, reference letter A points to an Archimedes' water screw, reference letter B points to an inner cylinder of the water screw, and reference letter C points to an outer casing (drawn transparently), which may hold stator components. Reference numeral 1 points to an outer cylinder (drawn transparently) of the water screw, which holds magnets. Reference numeral 2 points to permanent magnets with alternating poles. Reference numeral 3 points to EMF coils. Reference numeral 4 points to EMF coil supports (drawn transparently). As in FIG. 10, this view shows only one array of windings and magnets around the screw, this image shows five arrays of magnets and windings, any integer may be used as required by the design, and the outside structure is transparent.

Other embodiments may be within the scope of the following claims.

What is claimed is:

1. An apparatus comprising:
   a rotor defining a helical internal chamber and having an outer cylindrical portion;
   a plurality of magnets coupled with the outer cylindrical portion of the rotor to create a magnetic field surrounding the rotor;
   a housing surrounding the rotor, the housing having a variable electro-magnetic force element immersed in the magnetic field; and
   a bearing, wherein the outer cylindrical portion of the rotor comprises at least a portion of the bearing, which is integral to the rotor, and the housing holds a second portion of the bearing.

2. The apparatus of claim 1, wherein the rotor contains a screw having a helical thread that extends laterally entirely to an inner wall of the cylindrical portion and longitudinally for a full length of the cylindrical portion.

3. The apparatus of claim 2, wherein the screw has multiple threads to define a plurality of helical internal chambers within the rotor.

4. The apparatus of claim 1, further comprising a spacer coupled between the rotor and the plurality of magnets such that the plurality of magnets are coupled indirectly with the rotor.

5. The apparatus of claim 4, wherein the spacer comprises a solid ring coupled with an exterior surface of the rotor.

6. The apparatus of claim 4, wherein the spacer comprises a lattice coupled with an exterior surface of the rotor.

7. The apparatus of claim 1, wherein the housing comprises cast metal stator elements.

8. The apparatus of claim 1, wherein the variable electro-magnetic force element comprises wire windings.

9. The apparatus of claim 1, wherein the plurality of magnets are oriented with their magnetic fields perpendicular to a rotational axis of the rotor.

10. The apparatus of claim 1, wherein the plurality of magnets are oriented with their magnetic fields parallel to a rotational axis of the rotor.

11. The apparatus of claim 10, further comprising a stator comprising one or more printed circuit boards.

12. The apparatus of claim 1, wherein the housing is coupled with a dam.

13. The apparatus of claim 1, wherein the housing is coupled with a boat.

14. A system comprising:
a rotor comprising an Archimedean screw and a plurality of magnets;
a stator rotatably coupled with the rotor, wherein the rotor resides inside the stator; and
a bearing having a first member that is integral with an outer cylinder of the Archimedean screw.

15. The system of claim 14, wherein the Archimedean screw has a plurality of blades.

16. The system of claim 14, wherein the rotor further comprises a spacing structure, and wherein the plurality of magnets are coupled with the spacing structure, and the spacing structure is coupled with the Archimedean screw.

17. The system of claim 16, wherein the spacing structure comprises a lattice coupled with an exterior surface of the Archimedean screw.

18. The system of claim 14, wherein the plurality of magnets comprise axially magnetized permanent magnets oriented in a parallel arrangement.

19. The system of claim 14, wherein the rotor includes a first end and a second end that are both submerged in a liquid.

20. The system of claim 14, further comprising end caps attached to an outside of a last magnet in a series of magnets to prevent loss of magnetism and to return magnetism back to one or more primary flux regions of the motor.

21. A method comprising:
allowing a fluid to pass through a rotor comprising an Archimedes' screw with a bearing having a first member that is integral with an outer cylinder of the Archimedes' screw;
capturing magnetic flux using an electro-magnetic force element, the magnetic flux being induced by motion of the rotor resulting from the passing fluid; and
generating energy from the captured induced magnetic flux.

22. The method of claim 21, further comprising periodically using direct current electrical energy to reverse a flow of the fluid to pump the fluid back through the Archimedes' screw.

23. The method of claim 21, wherein the fluid comprises water.

24. The method of claim 23, further comprising periodically slowing a flow of the water to allow fish to pass through the Archimedes' screw against the flow.

25. The method of claim 24, wherein periodically slowing the flow of the water comprises periodically slowing the flow of the water using direct current electrical energy applied to the electro-magnetic force element.

26. The method of claim 21, wherein the fluid comprises atmospheric air, the method further comprising driving the air using the Archimedes' screw to create a vortex before generating energy from the captured induced magnetic flux.

* * * * *